Aug. 19, 1969 C. M. WINE ET AL 3,462,747

SEMI-PERMANENT MEMORY

Filed Aug. 12, 1965 2 Sheets-Sheet 1

INVENTORS
CHARLES M. WINE &
BY JAMES C. MILLER
Carl V. Olson
Attorney

Aug. 19, 1969 C. M. WINE ET AL 3,462,747

SEMI-PERMANENT MEMORY

Filed Aug. 12, 1965 2 Sheets-Sheet 2

INVENTORS
CHARLS M. WINE &
JAMES C. MILLER
BY
Carl V. Olson
Attorney

United States Patent Office 3,462,747

Patented Aug. 19, 1969

3,462,747
SEMI-PERMANENT MEMORY

Charles M. Wine, Princeton, and James C. Miller, Pennington, N.J., assignors to Radio Corporation of America, a corporation of Delaware Filed Aug. 12, 1965, Ser. No. 479,096
Int. Cl. G11b 5/62
U.S. Cl. 340—174 5 Claims

ABSTRACT OF THE DISCLOSURE

Memory in which stored information is determined mechanically and read out electrically. A magnetic sheet has a printed sense conductor sequentially threading aperture pairs in the sheet. The sense conductor goes in one aperture of a pair and out the other aperture of the pair to store a "1," and it encircles the magnetic material between two apertures of a pair to store a "0." A plurality of such magnetic sheets is arranged in a stack with interrogate wires threaded through the stack. Each interrogate wire passes through one aperture of corresponding aperture pairs in all sheets and returns through the other aperture of the corresponding aperture pairs in all sheets.

Figure 1:
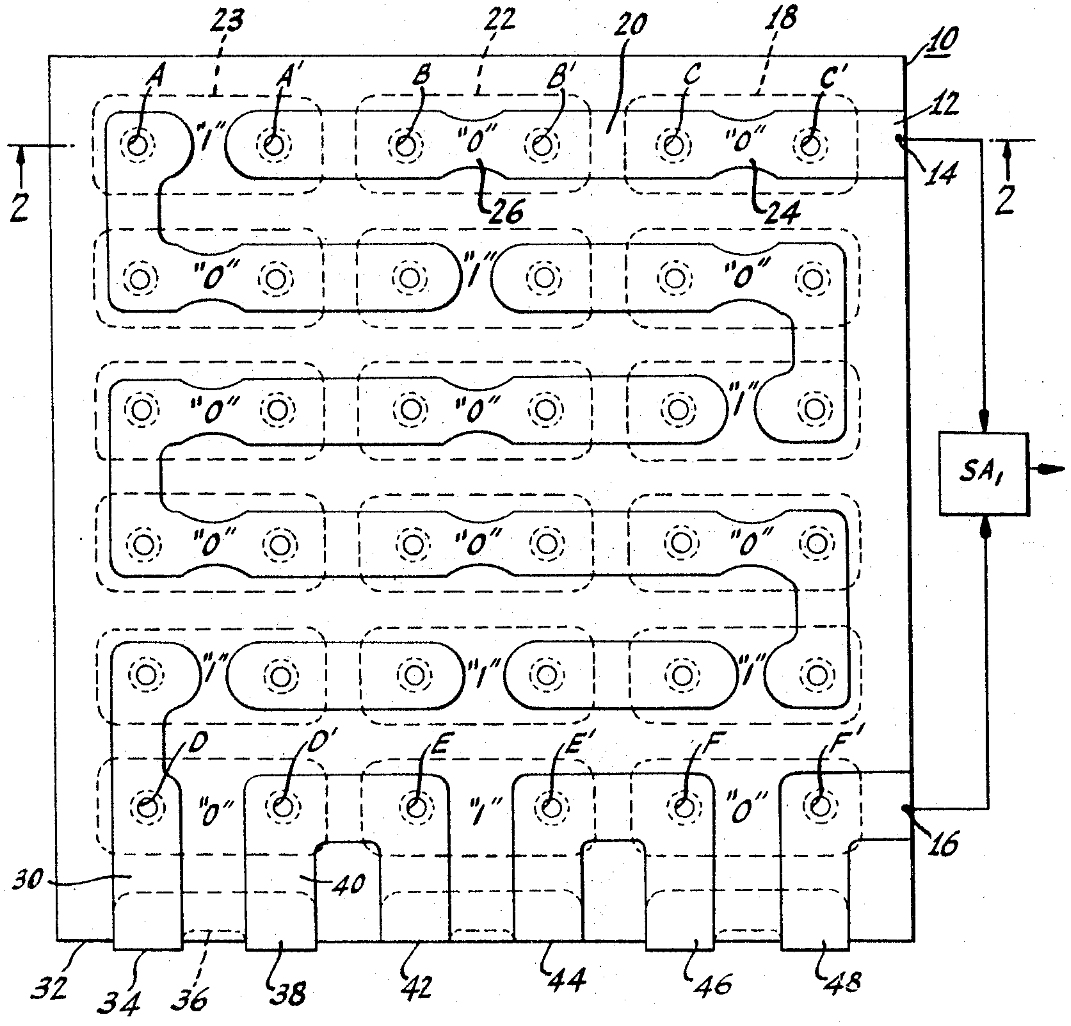

This invention relates to memories, and particularly to semi-permanent magnetic memories in which the stored digital information is determined mechanically, and from which the stored information may be read out electrically.

It is an object of this invention to provide an improved semi-permanent memory characterized in being adapted for economical, automated fabrication.

It is another object to provide an improved magnetic memory which, in relation to prior art arrangements, delivers relatively large amplitude information sense signals in response to relatively small amplitude interrogation pulses.

It is a further object to provide an improved high-speed random-access fixed memory having a short read-out cycle time measured in nanoseconds.

In accordance with an example of the invention, there is provided a semi-permanent memory including a plurality of magnetic sheets each having a plurality of pairs of apertures for a corresponding number of memory elements. Each magnetic sheet has a printed sense conductor sequentially threading all aperture pairs on the sheet by passing in one aperture of a pair and out the other aperture of the pair. At each aperture pair where it is desired to store a "0," an additional printed conductor segment cooperates with the printed sense conductor to complete a conductive short-circuiting turn around the magnetic material between two apertures of the pair. A "1" is stored at each aperture pair not having the short-circuiting segment. The plurality of magnetic sheets are arranged in a stack with interrogate wires extending through the stack. Each interrogate wire passes through one aperture of corresponding pairs in all of the sheets and returns through the other aperture of the corresponding pairs in all of the sheets. An interrogate pulse applied to a selected one of the interrogate conductors causes sense signals indicative of the corresponding stored information to be induced on all of the printed sense conductors.

Figure 2:
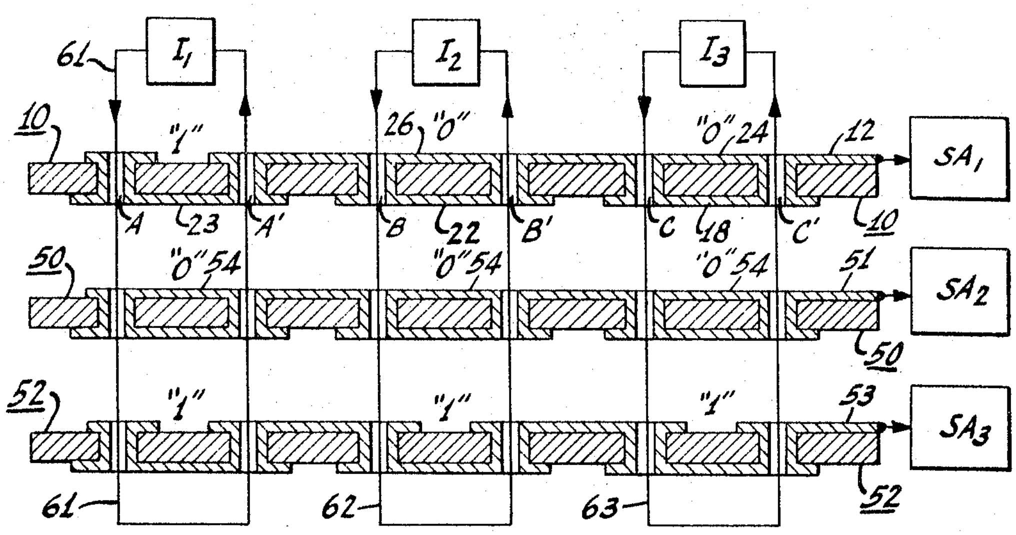

In the drawing:

FIG. 1 is a plan view of a magnetic sheet having apertures and printed conductors arranged to store eighteen binary bits; and FIG. 2 is a sectional view of three similar apertured magnetic sheets (including the magnetic sheet of FIG. 1) arranged in a stack, together with means for interrogating and sensing information stored in the stack.

Referring now in greater detail to FIG. 1, there is shown a magnetic sheet 10 which is preferably constructed of a high-permeability, low-loss magnetic material having a linear B–H characteristic, where B represents magnetic flux density and H represents magnetizing force. The magnetic sheet 10 may be constructed of magnetic ferrite material by compressing ferrite particles into sheet form, followed by a sintering step. Alternatively, the magnetic sheet 10 may be constructed using doctor blading techniques in which a slurry of ferrite material is spread over a smooth surface, allowed to dry, and then sintered to create the desired magnetic properties.

The magnetic sheet 10 is provided with pairs of apertures systematically arranged in rows and columns. Apertures A and A′ constitute one pair, apertures B and B′ constitute another pair and apertures C and C′ constitute a third pair. The illustrative magnetic sheet 10 of FIG. 1 is provided with a total of sixteen aperture pairs to provide a corresponding number of memory elements for the storage of sixteen binary bits. The apertures in magnetic sheet 10 may conveniently be made by punching holes in a green ferrite sheet made by the doctor blading process, before the green ferrite sheet is sintered.

The apertured magnetic sheet 10 is provided with a printed sense conductor 12 having one terminal end at 14 and having another terminal end at 16. The printed sense conductor 12 includes portions on the top surface of magnetic sheet 10, portions on the walls of all of the apertures in the sheet 10, and portions on the reverse side of the magnetic sheet 10. The conductive path provided by the printed sense conductor 12 may be traced from the terminal 14 through the aperture C′, through the portion 18 printed on the reverse side of magnetic sheet 10, back through the aperture C, along the top side of sheet 10 at 20, down through the aperture B′, along the reverse side at 22, up through the aperture B, and so on. The printed sense conductor 12 sequentially threads all aperture pairs on the magnetic sheet 10 by passing down through one aperture of a pair and returning up through the other aperture of the pair. The sense conductor 12 is plated or deposited on the magnetic sheet by any suitable known technique in such a way that the conductive material is deposited on the walls of the apertures leaving an opening through which an interrogate conductor or wire can be threaded.

Additional short-circuiting printed conductor segments are provided on the top side of magnetic sheet 10 between apertures of a pair where it is desired to store a "0." An additional conductive segment at 24, cooperates with the sense winding 12, 18 to complete a short-circuiting conductive path or turn around the magnetic material between the two apertures C and C′. Similarly, a conductive segment 26 completes a short-circuiting turn around the magnetic material between the apertures B and B′. The additional conductive segment is omitted between the apertures A and A′ where it is desired to store a "1." The same scheme is followed throughout the memory locations on the magnetic sheet 10. Every elemental memory location having an additional short-circuiting conductive segment or link is designated with a "0" to indicate the information bit stored therein, and every elemental memory location not having an additional conductive segment or link is designated with a "1" to indicate the information bit stored therein. Of course, the symbols "0" and "1" are arbitrarily assigned to the two structural arrangements, and the symbols may be transposed.

An aperture pair D, D′ located near the bottom edge of the magnetic sheet 10 is provided with a short-circuiting segment or link between the apertures which extends from the aperture D at 30, around the bottom edge 32 of the magnetic sheet at 34, along the reverse side of the magnetic sheet at 36, back around the edge 34 at 38 and along the top of the sheet at 40 to the aperture D'. Since the conductive path 30, 34, 36, 38 and 40 completes a short-circuiting turn around the magnetic material between the apertures D and D', the information stored in the memory element is a "0."

The conductive segment or link is constructed to pass around the peripheral edge 32 of the magnetic sheet 10 for the purpose of permitting a change in the information stored from a "0" to a "1." The conductive segment can easily be interrupted at 34 and/or at 38 where the printed conductor goes around the peripheral edge of the sheet 10 by means of an abrasive tool or a sharp scraping instrument. The peripheral edge 32 is exposed and separated from necessary connections to the memory.

The memory element defined by apertures E and E' is shown as having a printed segment or link which has been interrupted at 42 and 44 to change the stored information from a "0" to a"1." Conversely, the memory element defined by apertures F and F' stores a "0" because the printed segments or links remain intact at 46 and 48.

The construction of the printed circuit segments or links at the memory locations along the lower edge of the magnetic sheet 10 is designed to permit a modification of the stored information after the magnetic sheet 10 is assembled and wired into a memory stack. The three memory elements along the bottom edge of the magnetic sheet 10 may be spare elements not used until such time as it may be desired to modify information stored in other memory elements. In this event, some or all of the three peripheral memory elements may be made to store the desired new information and may be used in place of the memory elements storing the old information. The arrangement at the bottom peripheral edge of the magnetic sheet 10 of FIG. 1 may be employed also, if desired, on the other three peripheral edges of the magnetic sheet 10.

FIG. 2 is a sectional view taken on the line 2—2 of FIG. 1, and it also includes, in section, two other similar apertured magnetic sheets 50 and 52 arranged with sheet 10 in a stack. The magnetic sheet 50 as illustrated has additional short-circuiting conductor segments at 54 to cause the respective memory elements to store "0's." The magnetic sheet 52 as illustrated has an absence of short-circuiting segments to cause the respective memory elements to store "1's."

Corresponding memory elements in the magnetic sheets 10, 50 and 52 are threaded by an interrogate conductor 61, which may conveniently be in the form of an insulated wire. The interrogate wire 61 passes through one aperture of corresponding aperture pairs in all of the sheets 10, 50 and 52, and returns through the other aperture of the same aperture pairs in all of the sheets. The interrogate wire 61 is connected to an interrogate driver $I_1$ which supplies an interrogate current pulse through the loop path provided by the interrogate wire 61. Similarly, interrogate wires 62 and 63 provide loop paths for interrogate pulses from respective interrogate drivers $I_2$ and $I_3$ through respective corresponding aperture pairs in the magnetic sheets 10, 50 and 52.

The printed sense conductors 12, 51 and 53 on the respective magnetic sheets 10, 50 and 52 are connected to respective sense amplifiers $SA_1$, $SA_2$ and $SA_3$.

In the operation of the semi-permanent memory illustrated in FIGS. 1 and 2, a selected one of the interrogate drivers is energized to supply a pulse through the interrogate wire linking correspondingly-located memory elements in the several magnetic sheets. While FIG. 2 shows only three interrogate drivers $I_1$, $I_2$ and $I_3$, it will be understood that a memory stack including magnetic sheets having sixteen memory elements as shown in FIG. 1, will have sixteen corresponding interrogate drivers. If, for example, the interrogate driver $I_1$ is selected to supply a current pulse through the interrogate wire 61, information-indicating sense signals are induced on all of the printed sense conductors 12, 51 and 53. The interrogate current pulse going down wire 61 through the aperture A induces a sense signal voltage by transformer action in the portion of the sense conductor on the walls of the aperture. Likewise, the current pulse going up through wire 61 in the aperture A' induces a sense signal voltage in the portion of the sense conductor 12 on the walls of the aperture A'. The two induced sense signal voltages are in an additive polarity causing a current flow to the right in the diagram toward the sense amplifier $SA_1$. The resulting sense signal voltage is interpreted by the sense amplifier $SA_1$ as indicating the storage of a "1" at the selected location in the magnetic sheet 10.

At the same time, the interrogate pulse applied through the wire 61 to the memory element in magnetic sheet 50 fails to induce a voltage in the sense conductor 51 because of the presence of the short-circuiting segment or link 54. The absence of an induced voltage is a sense signal which is interpreted by the sense amplifier $SA_2$ as indicating the storage of a "0" at the accessed location in the magnetic sheet 50. The location in magnetic sheet 52 which is accessed by the interrogate driver $I_1$ is similar to the accessed location in magnetic sheet 10 in that it is shown as storing a "1" which causes an induced voltage to be supplied to the sense amplifier $SA_3$. Any one of the other corresponding memory elements in the several magnetic sheets may be similarly accessed by a respective interrogate driver.

In a memory stack actually constructed, the interrogate drivers supplied interrogate pulses having an amplitude of fifteen milliamperes and having a pulse width of twenty nanoseconds. A sense signal of from fifty to one hundred millivolts was induced on each sense conductor linking an accessed memory element storing a "1." A one-stage transistor differential sense amplifier produced an output "1"-indicating sense signal of two volts. The sense voltage output from a memory element storing a "0" was one-twentieth the voltage of an element storing a "1," and had an amplitude similar to random noise in the system. It was found that an interrogate driver providing an interrogate pulse of five milliamperes could produce "0" and "1" sense signals, which after being amplified in a one-stage differential amplifier, had amplitudes suitable for application directly to conventional computer logic circuits. The memory stack was operated at a repetition rate of twenty megacycles. Stated another way, the information stored in memory elements located along an interrogate wire could be read out, and disturbances could be allowed to die down sufficiently for initiation of a succeeding read-out, all within the time period of fifty nanoseconds.

The sets of conductors designated sense conductors, and the sets of conductors designated interrogate conductors, can be interchanged in function. That is, the interrogate drivers $I_1$, $I_2$ and $I_3$ can be transposed in relation to the sense amplifiers $SA_1$, $SA_2$ and $SA_3$. The connection of the interrogate drivers to wires threaded through the several magnetic sheets of the stack, and the connection of a sense amplifier to the printed conductor on each magnetic sheet, is a preferred operational arrangement in computer applications because it is usually desired to select any one of a large number of information words each having a relatively small number of information bits. For example, it may be desired to access any one of about four thousand words each having sixty-four bits. In such an arrangement, there would be sixty-four magnetic sheets each having an individual sense amplifier, and there would be four thousand interrogate wires each threading all sixty-four magnetic sheets.

What is claimed is:

1. A semi-permanent memory, comprising a magnetic sheet of material having a substantially linear B–H characteristic and having a plurality of pairs of apertures for a corresponding number of memory elements, a conductor printed on the magnetic sheet to sequentially thread all aperture pairs on the sheet by passing in one aperture of a pair and out the other aperture of the pair, a conductive path completing a short-circuiting turn around the magnetic material between two apertures of each aperture pair where it is desired to store a "0,"

a set of conductors each threading a respective aperture pair by passing in one aperture of a pair and out the other aperture of the pair, means to apply an interrogate pulse to any one of said conductors, and means to sense stored-information signals induced on others of said conductors.

2. A semi-permanent memory, comprising a plurality of magnetic sheets each having a plurality of pairs of apertures, a set of conductors each sequentially threading all aperture pairs on a respective magnetic sheet by passing in one aperture of a pair and out the other aperture of the pair, a conductor completing a short-circuiting turn around the magnetic material between two apereures of each aperture pair where it is desired to store a "0,"

a set of conductors each threading corresponding aperture pairs in the plurality of magnetic sheets by passing sequentially through one aperture of a pair in all of the sheets, means to apply an interrogate pulse to any one conductor of one of said sets of conductors, and means to sense stored-information signals induced on all conductors of the other one of said sets of conductors.

3. A semi-permanent memory, comprising a plurality of magnetic sheets of material having a linear B–H characteristic, each of said sheets having a plurality of pairs of apertures for a corresponding number of memory elements, a set of conductors each printed on a respective magnetic sheet to sequentially thread all aperture pairs on the sheet by passing in one aperture of a pair and out the other aperture of the pair, a printed conductor completing a short-circuiting turn around the magnetic material between two apertures of each aperture pair where it is desired to store a "0,"

a set of conductors each comprising a wire threading corresponding aperture pairs in the plurality of magnetic sheets by passing sequentially through one aperture in all of the sheets and returning through the other aperture of the pair in all of the sheets, means to apply an interrogate pulse to any one conductor of one of said sets of conductors, and means to sense stored-information signals induced on all conductors of the other one of said sets of conductors.

4. A semi-permanent memory, comprising a plurality of magnetic sheets each having a plurality of pairs of apertures for a corresponding number of memory elements, a set of sense conductors each printed on a respective magnetic sheet to sequentially thread all aperture pairs on the sheet by passing in one aperture of a pair and out the other aperture of the pair, a printed conductor connected with a sense conductor to complete a short-circuiting turn around the magnetic material between two apertures of each aperture pair where it is desired to store a "0,"

a set of interrogate conductors each comprising a wire threading corresponding aperture pairs in the plurality of magnetic sheets by passing sequentially through one aperture in all of the sheets and returning through the other aperture of the pair in all of the sheets, means to apply an interrogate pulse to any one of said interrogate conductors, and means to sense stored-information signals induced on all of said sense conductors.

5. A semi-permanent memory, comprising a plurality of magnetic sheets each having a plurality of pairs of apertures for a corresponding number of memory elements, a first set of conductors each printed on a respective magnetic sheet to sequentially thread all aperture pairs on the sheet by passing in one aperture of a pair and out the other aperture of the pair, a short-circuiting printed conductor connected to a conductor of said first set to complete a short-circuiting turn around the magnetic material between two apertures of each aperture pair where it is desired to store a "0," at least one of said short-circuiting printed conductors extending around a peripheral edge of said magnetic sheet for convenient manual interruption in case it is desired to change the stored information from a "0" to a "1," and a second set of conductors each threading corresponding aperture pairs in the plurality of magnetic sheets by passing sequentially through one aperture in all of the sheets and returning through the other aperture of the pair in all of the sheets.

References Cited

UNITED STATES PATENTS

| | | | |
|---|---|---|---|
| 3,245,058 | 4/1966 | Bruce | 340—174 |
| 3,171,103 | 2/1965 | Rumble et al. | 340—174 |

JAMES W. MOFFITT, Primary Examiner